United States Patent Office 3,281,212
Patented Oct. 25, 1966

3,281,212
SALT DISSOLVER APPARATUS
Charles E. MacKinnon, Lewiston Heights, N.Y., assignor to International Salt Company, Inc., Scranton, Pa.
Filed Jan. 18, 1962, Ser. No. 167,122
5 Claims. (Cl. 23—272)

This invention relates to an improved brine producing and filtering apparatus; and more particularly to an improvement in apparatus of such type which employ the various commercially available grades and sizes of industrial salts. Whereas several "upflow" type dissolvers are still in current use and may be satisfactory for certain applications, it is clearly recognized in the industry that this type involves an inherent disadvantage in that relatively fine solid salt particles in the dissolution bed tend to float upwardly and out through the brine withdrawal device. Hence, if such an apparatus is employed in an operation requiring clear brine, a second operation must be performed to remove the entrained solids. Downflow dissolvers avoid the above mentioned difficulties but for various reasons have heretofore involved other inherent disadvantages which the present invention overcomes; and thus the present invention relates to improvements in apparatus for the purposes disclosed for example in U.S. Patent No. 1,928,008.

The apparatus for the present invention is designed to dissolve salt in improved manner in connection with such apparatus of the downflow type, and more specifically, the apparatus of the present invention is designed to operate as aforesaid at a higher practicable rate of brine withdrawal, compared to prior art similar size dissolvers of the same type.

In order to eliminate the necessity of feeding such apparatus with salt constantly and uniformly at the rate of salt consumption as brine, it is customary in the art to provide supplemental salt storage hopper space above the elevation of the liquid level in the dissolver. This permits the dissolvers to be loaded with reserve salt supplies at intervals, thereby rendering the salt supply operation more practicable. However, as will be explained more fully hereinafter, whenever the salt supply extends above the liquid level in the dissolver a "critical rate" of brine withdrawal phenomena occurs, which effectively limits the maximum rate of brine withdrawal to something less than the rate indicated by the pump capacity and the corresponding fresh water inlet capacities.

It may be stated that a primary object of the present invention is to provide in an apparatus of the character referred to, means permitting practical operation of the apparatus to be operated at a higher rate of brine withdrawal; but other objects and advantages of the invention will be apparent from the specification hereinafter.

Figure 1:
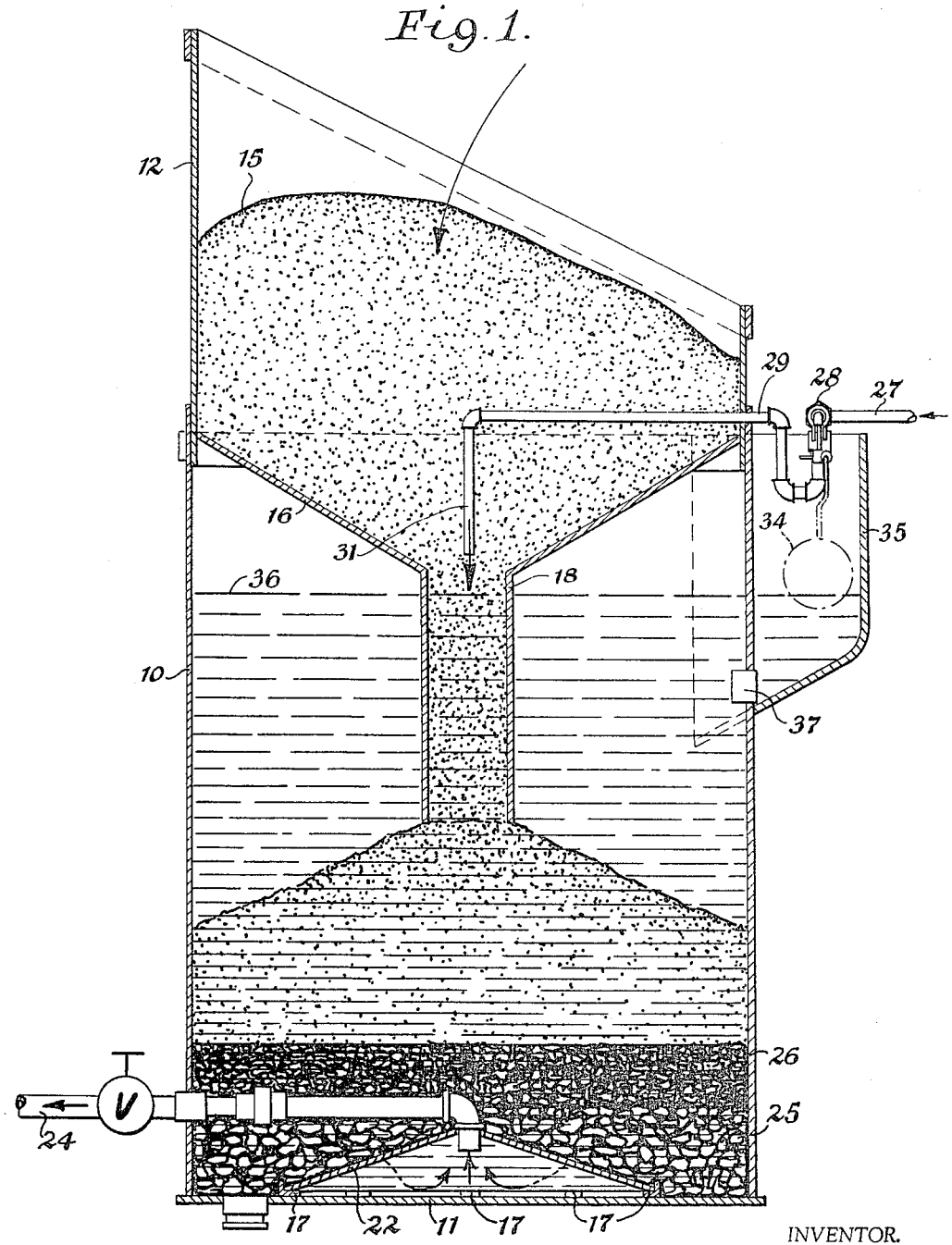
Figure 2:
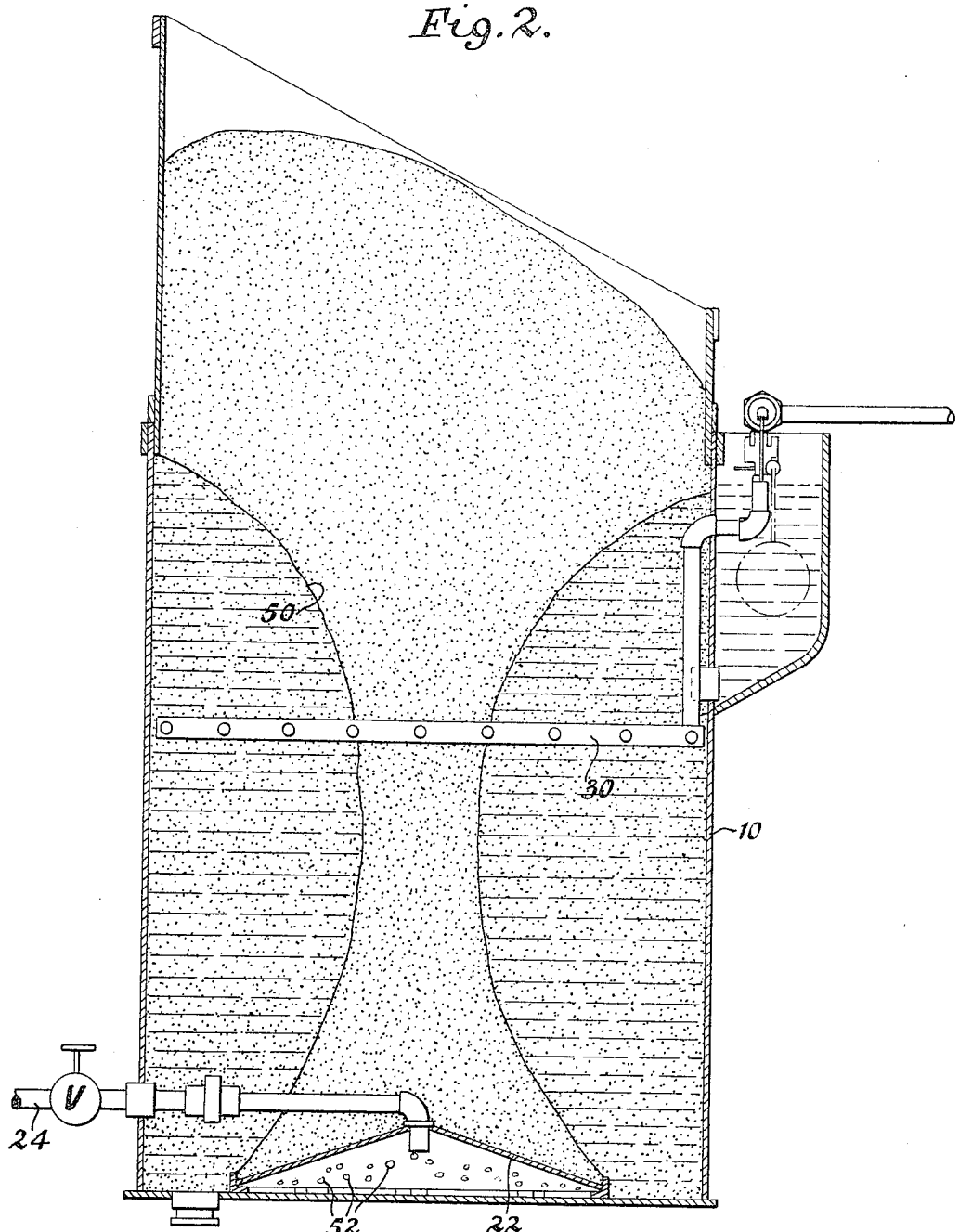

In the accompanying drawing:

FIG. 1 is a vertical section through a salt dissolving apparatus constructed according to one possible embodiment of the invention; and FIG. 2 is a schematic sectional view corresponding to FIG. 1, but of a conventional dissolver arrangement illustrating action of the "critical rate" effect referred to hereinabove.

Referring now specifically to the example illustrated by the drawing, the invention is illustrated therein as being embodied in a salt dissolving apparatus including generally a cylindrical tank or vat 10 having a bottom 11. The tank is preferably fitted with a supplemental hopper 12 to provide a salt storage space in which the salt supply as indicated at 15 is supported upon a conical bottom 16 leading to a central reduced diameter down spout 18 for automatic gravity-feeding into the bottom of the tank 10, as required. Thus, the salt may be either continuously or batch-loaded into the hopper 12 so as to provide a constantly available supply which will feed automatically into the bottom of the tank 10 in accord with the requirements of the system as will be explained more fully hereinafter.

As shown in FIG. 1, the brine withdrawal device includes a conically shaped canopy 22 mounted within the tank 10, in slightly vertically spaced relation above the bottom plate 11, as by means of spaced supports 17, to provide a brine collection chamber into which the brine withdrawal conduit 24 connects. Sized gravel beds as indicated at 25, 26 are disposed in the bottom of the tank to cover the canopy 22 and to filter the brine. A salt solvent such as water is introduced into the tank as by means of an inlet pipe or conductor 27 which leads through a valve 28 and thence into a feed pipe 29. Conventionally, the feed pipe connects into a spray ring as indicated at 30 (FIG. 2) extending around the inside wall of the tank; but in accord with the present invention the feed pipe connects to a pipe 31 discharging the liquid into the salt mass filling the down spout 18. This provides the necessary water supply and at the same time acts to water-seal the salt mass in the spout 18 against air leakages downwardly therethrough in response to the brine pump suction. A float device 34 in a float chamber 35 is arranged to control the valve 28 automatically, so that a constant liquid level may be maintained within the tank, such as at the level indicated at 36. A liquid level equalizer port as indicated at 37 is provided in the wall of the tank for this purpose.

Thus, it will be appreciated that a wet salt supply is maintained to cover the canopy 22 at the bottom of the tank while the water level is substantially maintained at the elevation 36; and that as brine is withdrawn from the pipe 24 a fresh supply of brine is filtered through the lower salt bed and thence passes through the gravel beds 25–26 and thence into the canopy for withdrawal through the conduit 24. Coincidentally with such brine withdrawal a new supply of fresh water is let into the tank through the valve 28 from the supply pipe 27; and thus the brine producing operation is continuous in accord with the requirements of the brine consuming operation.

Whereas apparatus of the type referred to are usually designed for fresh water inlet at a rate exceeding the anticipted maximum rate of brine withdrawal, the prior art devices are nevertheless defective in use when it is attempted to withdraw brine at the maximum indicated rate, due to the existence of a "critical rate" of brine withdrawal which is due to the preferential flow of air rather than solvent through the salt feed mass. Otherwise stated, as the brine withdrawal pumping rate is increased, the suction produced at the pump inlet, and existing within the canopy 22, is sufficient to draw air from above the liquid level 36 down through the wetted salt mass and into the brine withdrawal pump. As explained hereinabove, this tendency is prevalent because of the relative ence of air in the brine is objectionable and/or may be compared to the travel of liquid therethrough under the then existing pressures. Any entrance of air into the brine pumping system seriously lowers the efficiency of the system, and may even render the pump inoperative. Furthermore, in many instances of brine usage, the presence of air in the brine is objectionable and/or may be seriously detrimental to the process.

The present invention, however, provides means for elimination of the above referred to "critical rate" effect, and provides a system whereby the useful rate of brine withdrawal is limited only to the capacity of the brine pump and/or the comparable capacity of the fresh water inlet system. The invention accomplishes this purpose by virtue of provision of a substantially air tight liquid layer, as explained hereinabove, partitioning the salt dissolution portion of the apparatus from the dry salt storage hopper portion of the apparatus thus preventing any substantial drawing of air from externally of the apparatus into the brine outlet conduit.

FIG. 2 illustrates perphaps in exaggeration, how in conventional type dissolvers the "critical rate" effect limits the practicable rate of rate withdrawal to below that anticipated in view of the pump and fresh solvent inlet capacities. As shown at 50, when the brine withdrawal rate is increased to the critical rate, sufficient suction is produced at the brine inlet so that air from above the salt will be drawn down through the interstices of the mass towards the brine conduit 24 and enters the product brine under the canopy 22 as indicated at 52. This is because air is more fluid and will flow in response to this suction more readily than the brine will flow from the upper levels of the tank. However, as explained hereinabove, in the case of the present invention the liquid table established by the liquid feed manifold effectively seals off and prevents any air ingress to the brine withdrawal zone; thereby effectively increasing the practicable rate of brine withdrawal.

It will be appreciated that although only one form of the apparatus of the invention has been shown and described in detail, it will be apparent to those skilled in the art that the invention is not so limited but that various changes may be made therein without departing from the spirit of the invention or the scope of the appended claims.

I claim:

1. A "downflow" type apparatus for preparation of aqueous salt solutions, comprising a tank having a bottom wall and a hopper wall spaced above said bottom wall to define therebetween a combined salt and water storage chamber, a brine withdrawal device having a brine inlet disposed adjacent the bottom wall of said tank, a feed salt delivery conduit extending downwardly from the bottom of said hopper wall and terminating in spaced relation above said bottom wall of the tank, a liquid feed device discharging into said feed salt delivery conduit, and automatic control means regulating flow of feed liquid into said salt delivery conduit operable to maintain continuous flooding of said combined chamber and a liquid level above the lower end of the feed salt delivery conduit, thereby effectively sealing said tank against ingress of air from above.

2. A "downflow" type solids dissolving apparatus for preparation of solutions, comprising a tank having a bottom wall and a hopper wall spaced above said bottom wall, a solution withdrawal device having a solution inlet disposed adjacent the bottom wall of said tank, a feed delivery conduit extending downwardly from the bottom of said hopper wall and discharging to the bottom wall of said tank in spaced relation thereabove, a liquid feed device discharging into said feed delivery conduit, and automatic control means regulating flow of feed liquid into said delivery conduit operable to maintain continuous flooding of the tank to a level above the point of discharge from said delivery conduit, thereby effectively sealing said tank against ingress of air from above.

3. A downflow dissolver for soluble materials comprising, in combination,
   means forming an enclosure having a bottom outlet,
   a downspout projecting into said enclosure and terminating therewithin in spaced relation above said bottom outlet,
   means for supplying soluble material to said enclosure through said downspout for maintaining sufficient soluble material in said enclosure to back up within and fill said downspout,
   discharge means for introducing solvent into said enclosure through said downspout,
   means controlling said discharge means to maintain solvent at a level within said enclosure which is above the lower end of said downspout,
   and means for withdrawing material-solvent solution through said bottom outlet.

4. A downflow dissolver for soluble materials comprising, in combination,
   a tank having a bottom and side walls, and a top wall member in spaced relation above said bottom to define an enclosure in conjunction with said bottom and side walls,
   a downspout extending below said top wall member and terminating in spaced relation above said bottom,
   means for introducing soluble material into said enclosure through said downspout and for maintaining said downspout filled with soluble material,
   a solvent inlet conduit discharging into said downspout and means controlling flow of solvent through said conduit for maintaining a body of solvent within said enclosure at a level above the lower end of said downspout,
   and pump means having an intake connected with said enclosure adjacent said bottom of the tank.

5. A downflow dissolver for soluble material comprising
   an upright tank having a bottom and a downwardly and inwardly inclined hopper wall disposed below the upper edge thereof and in spaced relation above said bottom,
   a downspout projecting downwardly from the bottom of said hopper wall and terminating at its lower end in spaced relation above said bottom of the tank,
   a solvent supply conduit discharging into said downspout,
   valve means connected with said conduit for maintaining a body of water within said tank at a level above the lower end of said downspout,
   and means for forcibly withdrawing material-solvent solution adjacent the bottom of said tank.

References Cited by the Examiner

UNITED STATES PATENTS

| | | | |
|---|---|---|---|
| 928,966 | 7/1909 | Hardesty | 23—272 |
| 1,686,076 | 10/1928 | Evans | 23—309 |
| 2,055,836 | 9/1936 | Cowles | 23—272.6 |
| 2,749,222 | 6/1956 | Munroe | 23—272 |
| 3,168,379 | 2/1965 | Miller | 23—272 X |

FOREIGN PATENTS 556,684   3/1955   Canada.

NORMAN YUDKOFF, *Primary Examiner.*

GEORGE D. MITCHELL, *Examiner.*

S. J. EMORY, M. H. SILVERSTEIN,
*Assistant Examiners.*

UNITED STATES PATENT OFFICE
CERTIFICATE OF CORRECTION

Patent No. 3,281,212 October 25, 1966

Charles E. Mac Kinnon

It is hereby certified that error appears in the above numbered patent requiring correction and that the said Letters Patent should read as corrected below.

Column 1, line 35, for "apparatus" read -- apparatii --; column 2, line 43, for "apparatus" read -- apparatii --; column 2, line 45, for "anticipted" read -- anticipated --; lines 55 to 59, strike out "As explained hereinabove, this tendency is prevalent because of the relative ence of air in the brine is objectionable and/or may be compared to the travel of liquid therethrough under the ten existing pressures." read -- As explained hereinabove, this tendency is prevalent because of the relative ease with which air may travel through the salt mass as compared to the travel of liquid therethrough under the then existing pressures. --.

Signed and sealed this 22nd day of August 1967.

(SEAL)
Attest:

ERNEST W. SWIDER
Attesting Officer

EDWARD J. BRENNER
Commissioner of Patents